US008274756B2

(12) United States Patent
Wallash et al.

(10) Patent No.: US 8,274,756 B2
(45) Date of Patent: Sep. 25, 2012

(54) USE OF CARBON NANOTUBES TO FORM CONDUCTIVE GASKETS DEPLOYED IN SENSITIVE ENVIRONMENTS

(75) Inventors: Albert Wallash, Morgan Hill, CA (US); Ravinder Ajmani, Fremont, CA (US); John Contreras, Palo Alto, CA (US); Ryan Davis, Palo Alto, CA (US)

(73) Assignee: HGST Netherlands B.V., Amsterdam (NL)

( * ) Notice: Subject to any disclaimer, the term of this patent is extended or adjusted under 35 U.S.C. 154(b) by 316 days.

(21) Appl. No.: 12/638,173

(22) Filed: Dec. 15, 2009

(65) Prior Publication Data
US 2011/0141618 A1 Jun. 16, 2011

(51) Int. Cl.
*G11B 33/14* (2006.01)
(52) U.S. Cl. ............................. 360/99.22; 360/97.21
(58) Field of Classification Search ............. 360/97.01, 360/97.02, 97.03, 97.12, 97.21, 98.01, 99.22
See application file for complete search history.

(56) References Cited

U.S. PATENT DOCUMENTS

| 5,187,621 | A | 2/1993 | Tacklind |
| 6,105,381 | A | 8/2000 | Ghoshal |
| 6,265,466 | B1 | 7/2001 | Glatkowski et al. |
| 6,635,354 | B2 | 10/2003 | Bunyan et al. |
| 6,863,942 | B2 | 3/2005 | Ren et al. |
| 6,956,084 | B2 | 10/2005 | Wang et al. |
| 7,064,265 | B2 | 6/2006 | Cochrane |
| 7,525,758 | B2 | 4/2009 | Abe |
| 7,588,699 | B2 | 9/2009 | Park et al. |
| 7,588,700 | B2 | 9/2009 | Kwon et al. |
| 2004/0009353 | A1* | 1/2004 | Knowles et al. ............ 428/411.1 |
| 2005/0002850 | A1* | 1/2005 | Niu et al. ................... 423/447.1 |
| 2006/0229416 | A1* | 10/2006 | Walker et al. ................ 525/474 |
| 2006/0253942 | A1* | 11/2006 | Barrera et al. ............... 977/852 |
| 2008/0099998 | A1* | 5/2008 | Veca et al. .................... 277/313 |
| 2008/0308229 | A1* | 12/2008 | Patrick et al. ............ 156/345.34 |
| 2010/0144955 | A1* | 6/2010 | El-Hibri et al. .............. 524/514 |
| 2011/0073344 | A1* | 3/2011 | Zhang et al. .................. 174/50 |
| 2011/0124483 | A1* | 5/2011 | Shah et al. ..................... 501/32 |

OTHER PUBLICATIONS

Safety manual for external hard drives by Freecom, available online at http://www.freecomdemo.com/TexdtManual_CH/Hard%20Drive_Safety%20manual%20EN.pdf, printed on Sep. 29, 2009. Nanocyl NC7000 Carbon Nanotubes Provide the Cleanliness and Conductivity Required for Producing Innovative HDD Applications, available online at http://www.azonano.com/news.asp?NewsID=13693, printed on Sep. 29, 2009.
EMI Shielding Materials, available online at http://www.nationalpowerandsignal.com/EMIShieldingMaterials.htm, printed on Sep. 29, 2009.

* cited by examiner

*Primary Examiner* — Jefferson Evans
(74) *Attorney, Agent, or Firm* — Christopher J Brokaw; Brokaw Patent Law PC

(57) ABSTRACT

Approaches for implementing a conductive gasket comprising carbon nanotubes for deployment within a sensitive environment, such as an environment containing equipment whose operation may be affected by airborne particles or electromagnetic energy. For example, a hard-disk drive (HDD) comprises an enclosure that is formed by coupling a first component, such as a cover, to a second component, such as a base, using one or more gaskets. The one or more gaskets may be constructed using a material that includes carbon nanotubes. The composition of the material used to construct the gaskets may be selected to achieve a desired electromagnetic conductivity for the gaskets. In this way, the gaskets of the enclosure of the HDD do not render the enclosure vulnerable to external electromagnetic energy and are constructed in a manner that does not introduce any harmful airborne contaminants within the protective enclosure of the HDD.

13 Claims, 5 Drawing Sheets

USE OF CARBON NANOTUBES TO FORM CONDUCTIVE GASKETS DEPLOYED IN SENSITIVE ENVIRONMENTS

FIELD OF THE INVENTION

Embodiments of the invention relate to the use of carbon nanotubes to form conductive gaskets that are deployed in sensitive environments.

BACKGROUND OF THE INVENTION

The operation of certain types of equipment can be negatively affected by the presence of environmental hazards, such as airborne contaminants and/or electromagnetic fields. To prevent this harm from occurring, some sensitive equipment may be housed in an enclosure that is designed to keep out or minimize such contaminants.

An example of a piece of sensitive equipment housed within a protective enclosure is a hard-disk drive (HDD). A hard-disk drive (HDD) is a non-volatile storage device which is housed in a protective enclosure and stores digitally encoded data on one or more circular platters having magnetic surfaces. When an HDD is in operation, each platter is rapidly rotated by a spindle system. Data is read from and written to a platter using a read/write head which is positioned over a specific location on a platter by an actuator.

A read/write head uses a magnetic field to read data from and write data to the surface of the platter. As a magnetic dipole field decreases rapidly with distance from a magnetic pole, the space between a read/write head and the surface of a platter must be tightly controlled. To provide a uniform distance between a read/write head and the surface of a platter, an actuator relies on air generated by a self-acting air bearing surface to support the read/write heads at the proper distance away from the surface of a platter while the platter rotates. A read/write head therefore is said to "fly" over the surface of a platter. That is, the air pulled along by a spinning platter forces the head away from the surface of the platter. When a platter stops spinning, a read/write head must either "land" on the platters or be pulled away.

Electromagnetic fields can interfere with the proper operation of the hard-disk drive. The enclosure of a hard-disk drive can, in some cases, amplify external electromagnetic fields, which can be problematic. To address this problem, the enclosure of a hard-disk drive may be designed to reduce the amplification of external electromagnetic fields to protect the interior of the hard-disk drive.

The protective enclosure of a hard-disk drive is formed by joining two or more different pieces together. For example, the enclosure can be formed by joining a top cover of the hard-disk drive with a base of the hard-disk drive using one or more screws. The distance between the screws determines the resonant frequencies of the electromagnetic energy entering the hard-disk drive. By shortening the distance between the screws, the resonant frequencies are increased to frequencies that did not affect the operation of the hard-disk drive. Thus, by adding more screws to the enclosure, the enclosure's ability to protect its contents from electromagnetic energy is increased. It is noted that copper tape can also be placed between screws to achieve the same affect, as copper tape acts like adding an extra screw to the enclosure. Unfortunately, adding screws and/or copper tape to the enclosure adds to the cost of manufacturing the hard-disk drive.

SUMMARY OF THE INVENTION

Techniques are provided for implementing a conductive gasket for deployment within a sensitive environment, such as a hard-disk drive (HDD). In an embodiment of the invention, a conductive gasket may be formed out of material (hereinafter "gasket material") that comprises carbon nanotubes. The carbon nanotubes within the gasket material cause the gaskets formed out of the gasket material to become conductive. By sealing the protective, conductive enclosure of a hard-disk drive using such gaskets, external electromagnetic energy cannot penetrate the conductive enclosure of the hard-disk drive (HDD). The gasket material may be any type of material, such as a Thermal plastic elastomer (TPE), fluroelastomer (FKM), or a generic elastomer, which meets certain conductivity and cleanliness criteria.

While embodiments of the invention shall chiefly be described with reference to examples involving gaskets sealing the protective enclosure of a hard-disk drives (HDD), the conductive gaskets presented herein may be used in any context, in particular those where cleanliness and protection against electromagnetic fields is desirable.

In an embodiment, a gasket may comprise a conductive portion and an insulating portion. For example, if a gasket is a formed-in-place gasket (FIPG), then the amount of carbon nanotubes comprised within the bead of material applied to a surface in forming the FIPG may be adjusted to adjust the conductivity of that portion of the FIPG. In this way, there may be a plurality of noncontiguous conductive portions in an otherwise insulating FIPG.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF THE INVENTION

Approaches for implementing a conductive gasket that comprises carbon nanotubes for deployment in a sensitive environment are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Physical Description of Illustrative Embodiments of the Invention

Figure 1:
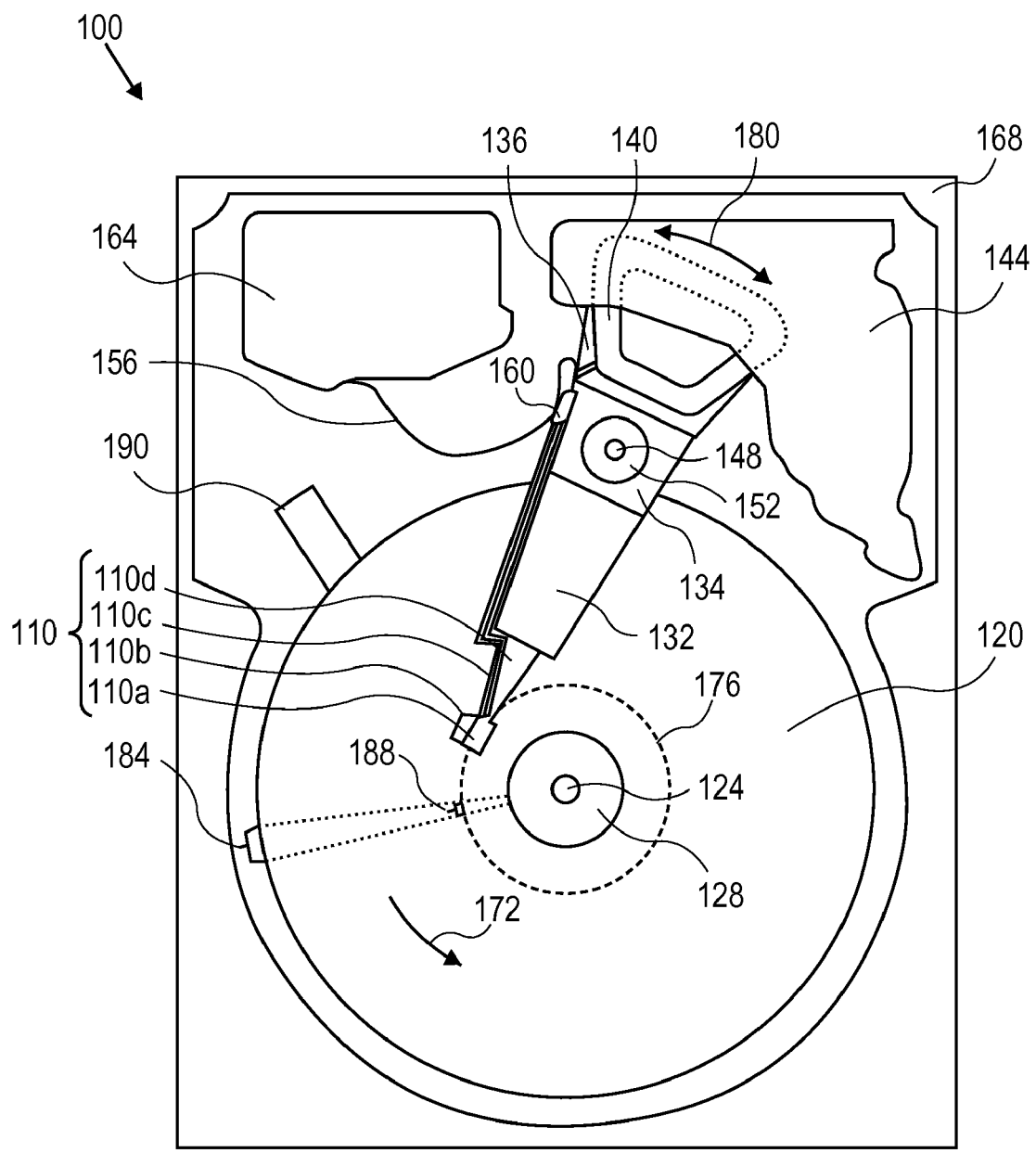
FIG. 1 is an illustration of a plan view of an HDD according to an embodiment of the invention.

To illustrate an example of how a conductive gasket comprising carbon nanotubes may be deployed, an illustrative hard-disk drive (HDD) that includes a conductive gasket that comprises carbon nanotubes according to an embodiment of the invention shall now be explained. With reference to FIG. 1, in accordance with an embodiment of the present invention, a plan view of a HDD 100 is shown. FIG. 1 illustrates the functional arrangement of components of the HDD including a slider 110b including a magnetic-recording head 110a. The HDD 100 includes at least one head gimbal assembly (HGA) 110 including the head 110a, a lead suspension 110c attached to the head 110a, and a loadbeam 110d attached to the slider 110b, which includes the head 110a at a distal end of the slider 110b; the slider 110b is attached at the distal end of the loadbeam 110d to a gimbal portion of the loadbeam 110d. The HDD 100 also includes at least one magnetic-recording disk 120 rotatably mounted on a spindle 124 and a drive motor (not shown) attached to the spindle 124 for rotating the disk 120. The head 110a includes a write element, a so-called writer, and a read element, a so-called reader, for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals (for example, current to the voice coil 140 of the VCM, write signal to PMR head 110a, and read signal from the PMR head 110a) are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 entrains air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120.

Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Figure 2:
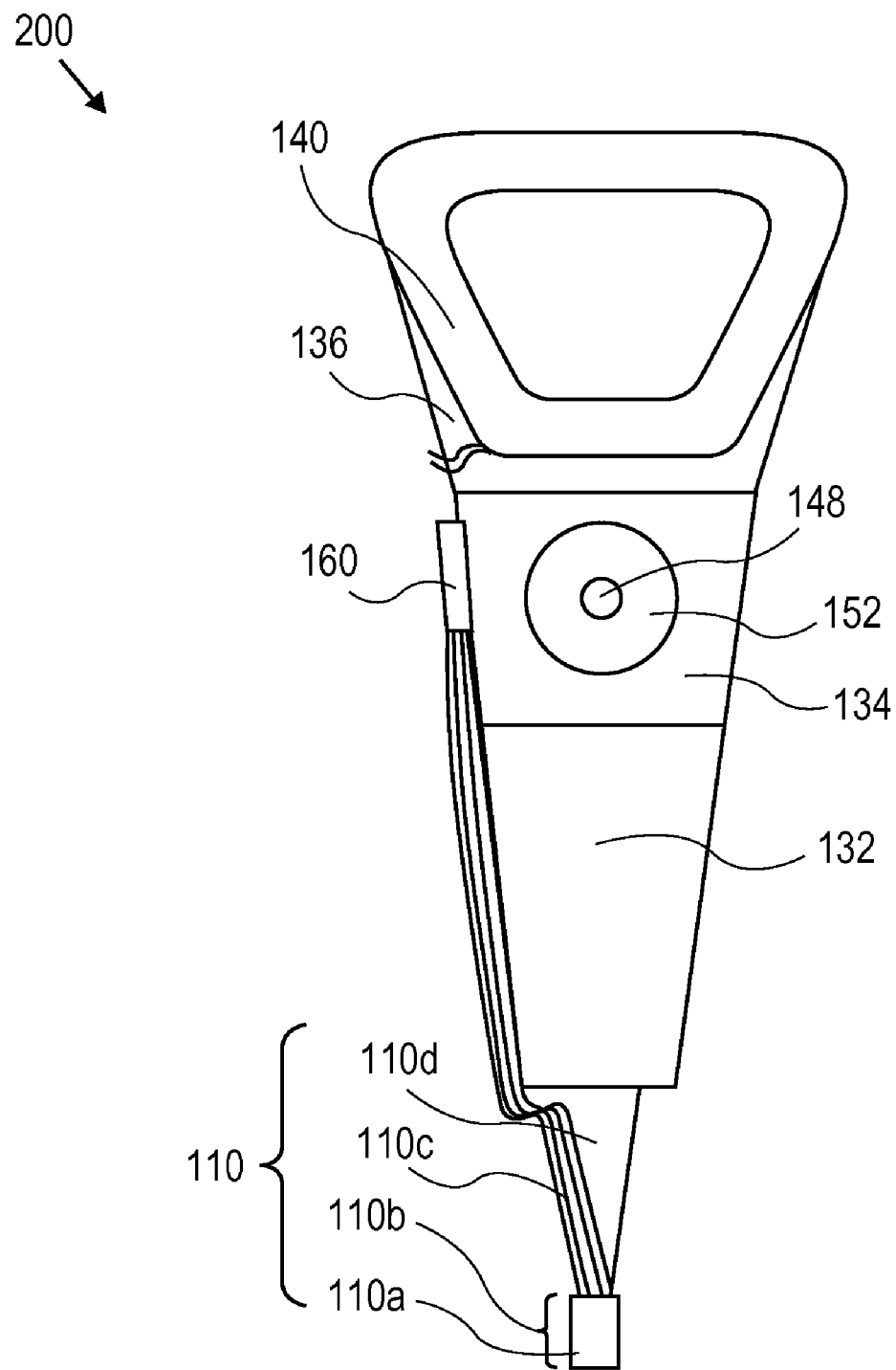
FIG. 2 is an illustration of a plan view of a head-arm-assembly (HAA) according to an embodiment of the invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Having described an illustrative description of HDD 100 according to an embodiment of the invention, information about the conductive gaskets used to form the enclosure of HDD 100 will now be discussed.

Conductive Gaskets Comprising Carbon Nanotubes

Figure 3:
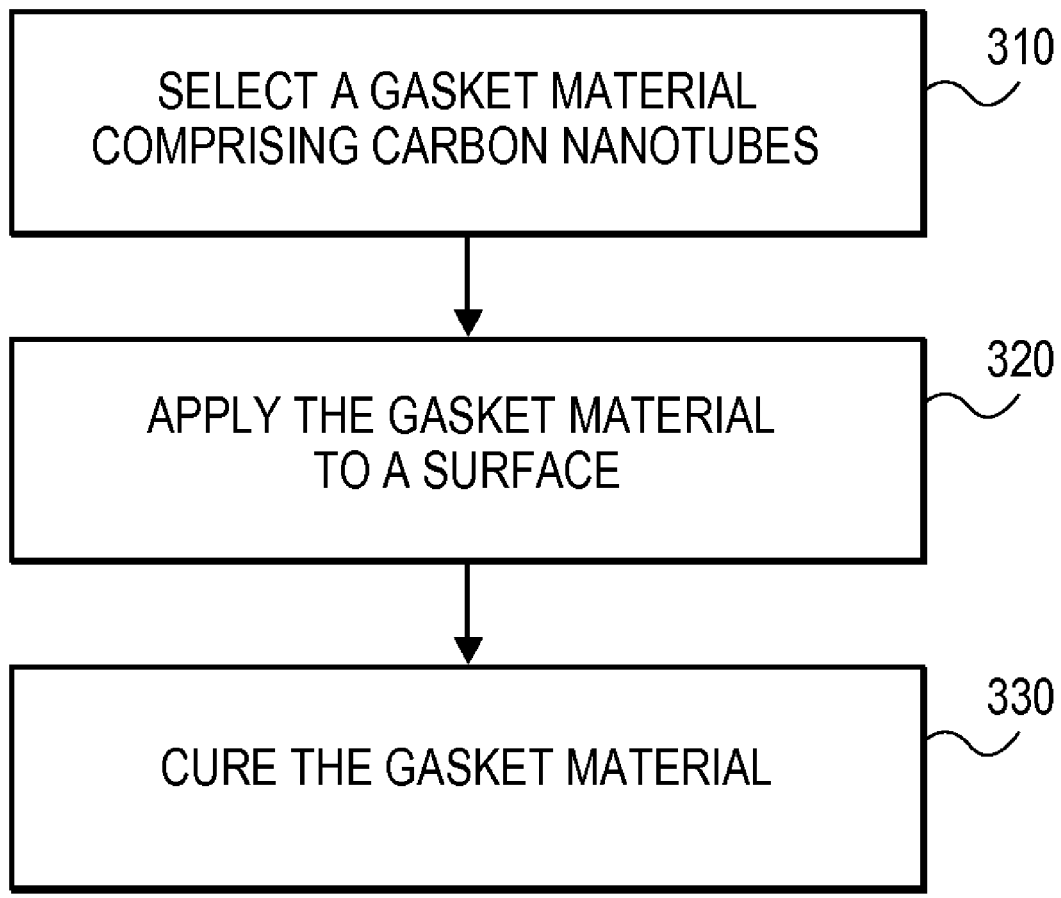
FIG. 3 is a flow chart illustrating the steps of creating a conductive gasket in a hard-disk drive (HDD) according to an embodiment of the invention.

FIG. 3 is a flowchart illustrating the steps of creating a conductive gasket for use in the enclosure of a hard-disk drive (HDD) according to an embodiment of the invention. While the steps of FIG. 3 shall be explained with reference to creating a formed-in-place gasket (FIPG), the gasket material discussed herein from which conductive gaskets may be created can be used to create a wide variety of gaskets; as such, embodiments of the invention are not limited to any particular type of gasket.

In step 310, a material (a "gasket material") from which one or more gaskets may be formed is selected. The gasket material may be any type of material, such as a Thermal plastic elastomer (TPE), fluroelastomer (FKM), or a generic elastomer, which meets certain conductivity and cleanliness criteria discussed below. The gaskets formed out of the gasket material selected in step 310 may be used to form an enclosure to protect electronic equipment, such as the interior of HDD 100. In an embodiment, the gasket formed out the gasket material selected in step 310 should be airtight, i.e., prevent any type of gas to traverse the gasket.

In an embodiment, the gasket material selected in step 310 is conductive. This is so because the gaskets made out of the gasket material should be conductive so that the enclosure in which they are employed provides proper shielding against electromagnetic fields. A conductive material is distinguishable over a static dissipative material. A static dissipative material may have a resistivity of $10^4$ to $10^{11}$ ohm-meters, while a conductive material has a resistivity of less than $10^4$ ohm-meters.

In an embodiment, the gasket material is "clean," that is to say, gaskets formed out of the gasket material should not introduce an undesirable amount of airborne particles or contaminants into the interior of the enclosure. In an embodiment, the gaskets formed out of the gasket material should also not introduce an undesirable amount of airborne particles or contaminants into the exterior of the enclosure, which may be advantageous if the hard-disk drive (HDD) is in a clean room environment.

In an embodiment, the gasket material may contain a certain amount of carbon nanotubes to achieve the desired conductivity and cleanliness criteria. Carbon nanotubes are excellent conductors compared to other "clean" solutions, and by adding a certain amount of carbon nanotubes to the gasket material, the gasket material may also become conductive. Carbon nanotubes also pose little to no contamination problems as carbon nanotubes are so small that they protrude out of the gasket material far less than other clean materials. Consequently, there is a reduced chance that the carbon nanotubes will break off and become airborne, which would create a potential hazard in certain electronic equipment.

In an embodiment, carbon nanotubes may constitute 5% or less of the gasket material. It is anticipated that having 1-3% of the gasket material being carbon nanotubes will meet or exceed the desired conductivity and cleanliness criteria, although the exact amount will need to be verified by experimentation for the particular gasket material selected. The amount of carbon nanotubes to add to the gasket material may vary from implementation to implementation, as the desired conductivity of the gasket material may also vary based on the spacing between the surfaces joined by the gasket. The desired conductivity also depends on the geometry of the formed-in-place gasket (FIPG), as the thickness of the FIPG increases, the size of the path for the electricity to travel also increases, thereby requiring the FIPG to be less conductive.

It is not necessary for carbon nanotubes to constitute more than 5% of the gasket material, as additional conductivity benefits will not be gained because adding more carbon nanotubes to the gasket material beyond 5% will not make the gasket material any more conductive because the conductivity at that point will be limited by the resistance of the carbon nanotubes themselves. Thus, it may be desirable to add just enough carbon nanotubes to the gasket material to achieve the desired conductivity.

In an embodiment, the amount of carbon nanotubes added to the gasket material may be configured to achieve an acceptable viscosity of the gasket material. By adding carbon nanotubes to the gasket material, the viscosity of the gasket material may increase. As it may be desirable to be able to squeeze the gasket material through a dispenser or tube, it is advantageous to ensure that the amount of carbon nanotubes added to the gasket material does not adversely impact the viscosity of the gasket material to prevent it from being dispensed.

Figure 4:
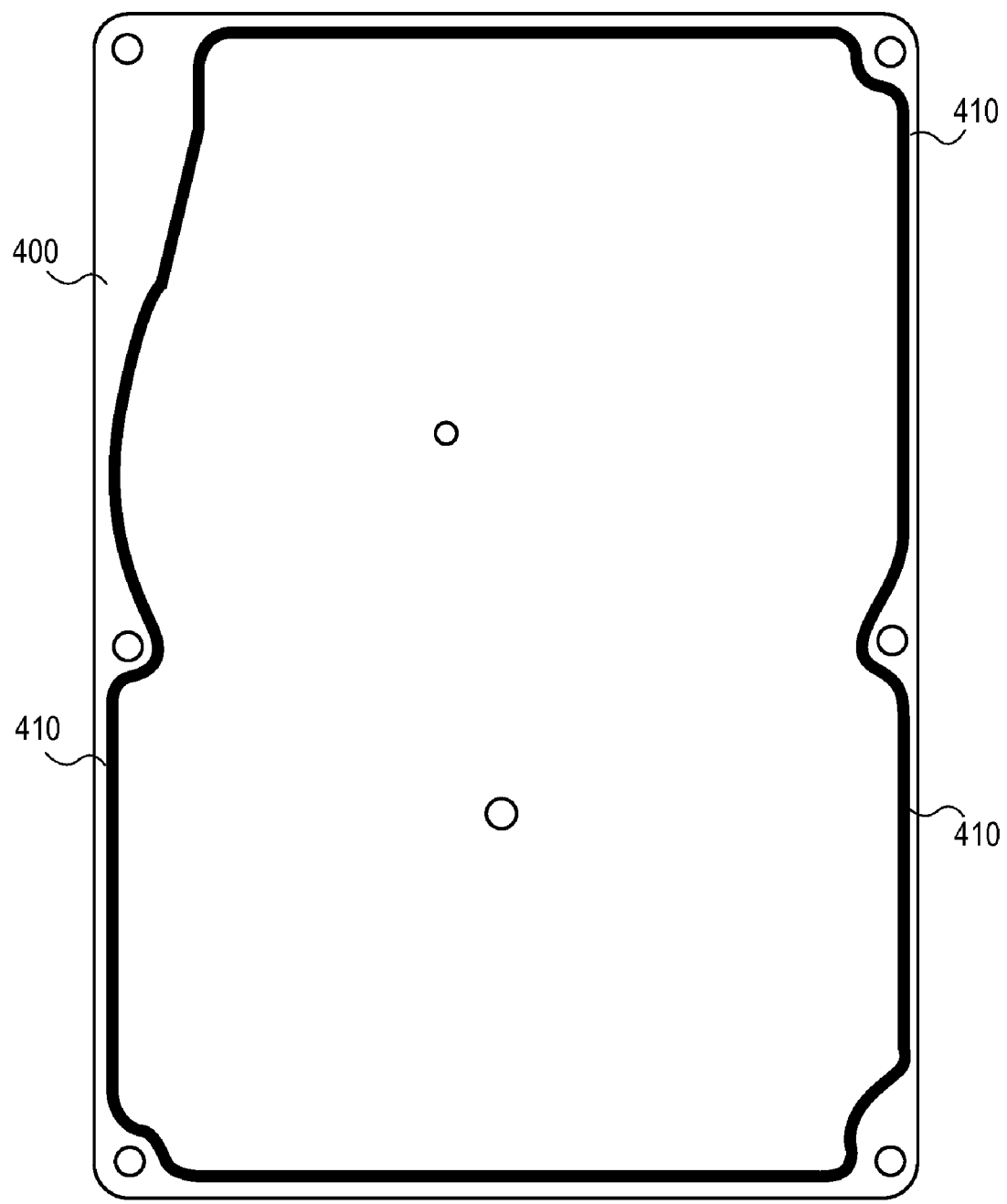
FIG. 4 is an illustration of a cover of a hard-disk drive (HDD) according to an embodiment of the invention.

In step 320, the material selected in step 310 is applied to one or more locations on a component, such as a cover or base of HDD 100. For example, to create a formed-in-place gasket (FIPG), a continuous bead of gasket material may be dispensed onto a cover of a hard-disk drive (HDD). To illustrate, consider FIG. 4, which is an illustration of a cover 400 of a hard-disk drive (HDD) according to an embodiment of the invention. As shown in FIG. 4, cover 400 includes a formed-in-place gasket (FIPG) 410. To create formed-in-place gasket (FIPG) 410, a continuous bead of gasket material is dispensed on cover 400 as shown in FIG. 4. After the continuous bead of gasket material is cured, then the continuous bead of gasket material would create formed-in-place gasket (FIPG) 410.

In step 330, the gasket material applied in step 320 is cured to form the one or more conductive gaskets. The process of curing gasket material transforms the gasket material from a liquid, viscous material to a rubbery, resilient material. The gasket material may be cured in a variety of different ways, depending on the particular gasket material selected in step 310. For example, certain gasket materials may be cured by one or more of ultra violet light, heat, a chemical reaction, and/or exposure to air.

Figure 5:
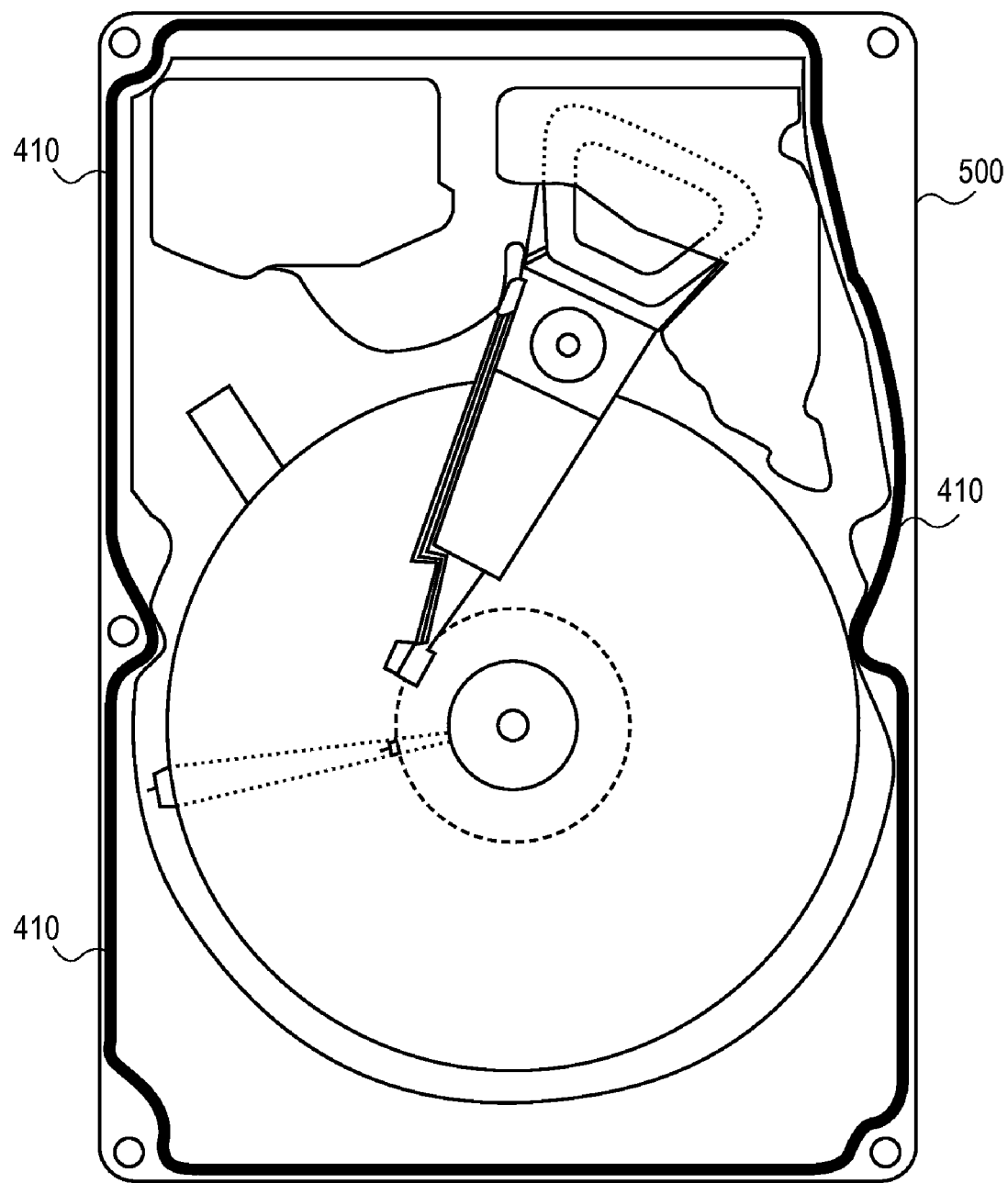
FIG. 5 is an illustration of a base of a hard-disk drive (HDD) according to an embodiment of the invention.

To illustrate how formed-in-place gasket (FIPG) 410 creates a protective enclosure, consider FIG. 5, which is an illustration of a base 500 of a hard-disk drive (HDD) according to an embodiment of the invention. Cover 400 and base 500 may be coupled together to form the protective enclosure of HDD 100. As cover 400 and base 500 may be conductive, if formed-in-place gasket (FIPG) 410 is also conductive, then the interior of cover 400 and base 500 will completely be enclosed in a conductive enclosure, which will act as a Faraday shield.

According to one approach, gasket material may be applied to one or more of cover 400 and base 500 and then subsequently cured. Thereafter, cover 400 and base 500 may be joined together and attached, e.g., by using one or more screws. Formed-in-place gasket (FIPG) 410 creates an airtight seal between cover 400 and base 500 that prevents both airborne particles and electromagnetic fields from entering the interior of HDD 100. In another approach, cover 400 and base 500 may be joined together and attached using formed-in-place gasket (FIPG) 410. Thus, after performed step 320, cover 400 and base 500 are joined together and the gasket material is cured to formed formed-in-place gasket (FIPG) 410, which attaches cover 400 to base 500.

In order for formed-in-place gasket (FIPG) 410 to provide proper shielding from electromagnetic fields, formed-in-place gasket (FIPG) 410 should have a conductive connection between cover 400 and base 500. Thus, if either cover 400 or base 500 are covered with a non-conductive layer over a conductive layer, then it may be necessary to remove a portion of the non-conductive layer of cover 400 or base 500 to expose the conductive layer where formed-in-place gasket (FIPG) 410 is in contact to ensure that formed-in-place gasket (FIPG) has a conduction connection to cover 400 and base 500. It is noted that removing a portion of the non-conductive layer of cover 400 or base 500 to expose the conductive layer is optional, as certain embodiments of the invention may not perform this step.

Selectively Configuring the Conductivity of Gaskets

It is observed that in certain contexts, even if the enclosure of sensitive equipment, such as HDD 100, has relatively small gaps that are spaced, the enclosure may still provide adequate shielding from electromagnetic fields. As a result, certain embodiments may employ gaskets that are less conductive, or even insulting, in certain portions while still providing sufficient shielding against electromagnetic fields.

In an embodiment, a gasket may comprise a conductive portion and an insulating portion. For example, if a gasket is a formed-in-place gasket (FIPG), then the amount of carbon nanotubes comprised within the bead of gasket material applied to a surface in forming the FIPG may be adjusted to adjust the conductivity of that portion of the FIPG. In this way, there may be a plurality of noncontiguous conductive portions in an otherwise insulating FIPG.

The placement of the conductive portions of the gasket may be configured to achieve certain desirable effects. For example, point contacts or longer regions in the FIPG may be conductive while the remaining portion of the gasket may be insulating. By configuring the amount of carbon nanotubes added in this manner, fewer amounts of carbon nanotubes need to introduced into the gasket, thereby minimizing the risk of contamination (while carbon nanotubes are cleaner than most materials, there still is a small contamination risk posed by any material introduced within the interior of HDD 100) and cost. Moreover, adding carbon nanotubes to the gasket material may cause the gasket material to become stiffer or more resilient, and thus, may cause a greater deflection of the cover of HDD 100 when the cover is attached to the base of HDD 100. Thus, reducing the amount of carbon nanotubes in portions of the gasket which may be allowed to be insulating may cause less deflection in the cover when it is reattached to the base of HDD 100.

While the conductive gaskets described herein have chiefly been described as being deployed within HDD 100, they can be used in any environment or context, especially those in which it is advantageous to shield against electromagnetic fields and/or reduce the number of contaminants or airborne particles introduced by a gasket. For example, conductive gaskets according to embodiments of the invention may find utility in being used in a tape drive, a tool or device in a clean room, in equipment near or susceptible to magnets or a magnetic field, or in a high precision weight system which cannot tolerate airborne particles.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive (HDD), comprising:
   an enclosure;
   a magnetic-recording head;
   one or more magnetic-recording disks rotatably mounted on a spindle;
   a drive motor having a motor shaft attached to the spindle for rotating the one or more magnetic-recording disks; and
   a voice-coil motor configured to move magnetic-recording head to access portions of the one or more magnetic-recording disks,
   wherein the enclosure is formed by coupling a first component to a second component using one or more gaskets, wherein the one or more gaskets are constructed using a material that includes carbon nanotubes, and wherein the composition of the material is selected to achieve a desired electromagnetic conductivity for the material.

2. The hard-disk drive (HDD) of claim 1, wherein the one or more gaskets are formed-in-place gaskets (FIPG).

3. The hard-disk drive (HDD) of claim 1, wherein the one or more gaskets each comprise a first portion and a second portion, wherein the first portion of each gasket is conductive, and wherein the second portion of each gasket is insulating.

4. The hard-disk drive (HDD) of claim 3, wherein the first portion of at least one gasket, of the one or more gaskets, is comprised of a plurality of non-contiguous regions of the at least one gasket.

5. The hard-disk drive (HDD) of claim 1, wherein the composition of the material is selected such that the material does not introduce an undesirable amount of particles within the interior of the hard-disk drive (HDD).

6. The hard-disk drive (HDD) of claim 1, wherein the first component is a cover of the hard-disk drive (HDD) and the second component is a base the hard-disk drive (HDD).

7. The hard-disk drive (HDD) of claim 1, wherein the one or more gaskets are formed using thermal curing.

8. The hard-disk drive (HDD) of claim 1, wherein the one or more gaskets are thermal plastic elastomer (TPE) molded or fluroelastomer (FKM) molded gaskets.

9. The hard-disk drive (HDD) of claim 1, wherein the one or more gaskets are formed using ultra-violet light curing or chemical reaction-based curing.

10. An electrical device, comprising:
    an enclosure;
    one or more sensitive electronic components disposed within the enclosure, wherein the one or more sensitive electronic components are intended to operate in an environment with a number of airborne particles below a particular threshold,
    wherein the enclosure is formed by coupling a first component to a second component using one or more gaskets, wherein the one or more gaskets are constructed using a material that includes carbon nanotubes, and wherein the composition of the material is selected to achieve a desired electromagnetic conductivity for the material.

11. The electrical device of claim 10, wherein the electrical device is intended to operate in a clean room environment.

12. A method for creating a gasket in a hard-disk drive (HDD), comprising:
    selecting a material from which to form one or more gaskets, wherein the material includes carbon nanotubes;
    applying the material to one or more locations on a first component; and
    curing the material to form the one or more gaskets, wherein the one or more gaskets couple the first component to a second component.

13. The method of claim 12, wherein the carbon nanotubes comprise between one and three percent of the material.

* * * * *